United States Patent [19]
Martin

[11] Patent Number: 5,125,220
[45] Date of Patent: Jun. 30, 1992

[54] HORSE BLANKET
[75] Inventor: Jack L. Martin, Libertyville, Ill.
[73] Assignee: Libertyville Saddle Shop, Inc., Libertyville, Ill.
[21] Appl. No.: 753,385
[22] Filed: Aug. 30, 1991
[51] Int. Cl.⁵ .................................................. B68C 5/00
[52] U.S. Cl. ...................................................... 54/79
[58] Field of Search .................. 119/143, 160; 54/79, 54/80, 66, 65

[56] References Cited

U.S. PATENT DOCUMENTS

| | | | |
|---|---|---|---|
| 1,028,138 | 6/1912 | Schleicher | 54/79 |
| 1,159,495 | 11/1915 | Hill | 54/79 |
| 1,175,272 | 3/1916 | Kinder | 54/79 |
| 1,558,117 | 10/1925 | Rasch | 54/79 |
| 1,609,577 | 12/1926 | Schroedter | 54/79 |
| 4,489,676 | 12/1984 | Colquist | 119/143 |
| 4,955,182 | 9/1990 | Newman | 54/79 |

FOREIGN PATENT DOCUMENTS 2223390  4/1990  United Kingdom ............ 54/79

Primary Examiner—Gene Mancene
Assistant Examiner—Thomas Price
Attorney, Agent, or Firm—Frank R. Thienpont

[57] ABSTRACT

A horse blanket or cover embodying a dual front closure system including (a) interlocking fabric fastener, and (b) adjustable strap so as to provide unlimited adjustment and a fixed locking feature once properly adjusted.

17 Claims, 4 Drawing Sheets

HORSE BLANKET

This invention relates to blankets or covers for horses and particularly to the front closure construction of such a blanket or cover.

BACKGROUND

Substantially all horse blankets are made with two types of closures in the front—Closed or Open in several varieties.

With respect to the closed front type, both sides or flaps are merely stitched together with some type of reinforcement over the seam. While such construction is permanent and requires no adjustment when it is put on a horse, it has the disadvantage, of course, that it must fit perfectly, which most do not, because horses come in a variety of sizes. The result is that it can be too tight and break or be too loose and sag and snag. Furthermore, small individuals often have difficulty putting the blanket on the horse because it must be put up and over the horse's head. Some horses' temperaments do not permit this Thus, while a closed front is simple and needs no adjustment, the disadvantage is that no adjustment is possible, a perfect fit is not always possible, and it must be put up and over a horse's head.

The open front generally has been provided to overcome the disadvantages of the closed front. There are many types of open fronts. The following will include substantially all of the varieties: (a) single strap closure as illustrated generally in FIG. 8 of the drawings herein; (b) two-strap closure as illustrated in FIG. 7; (c) two adjustable closures, web or elastic, as illustrated generally in FIG. 6; (d) one/two straps in grommets, metal or leather as illustrated generally in FIG. 9.

While the open front closures partially overcome the objections of the closed front closure, because of manufacturing efficiencies, such, for example, as skimping on front materials, the intended overlapping front is not always achieved, and, as a consequence, snagging and tearing is often experienced. Under these conditions the horse can fight the blanket in its stall thus rubbing and possibly injuring its chest. In addition, if the blanket is not closed completely, the cold can enter. Strength and tearing is also a problem because horses do not always like to be blanketed. A horse will often fight a blanket and eventually tear it off.

Accordingly, the need has arisen for a horse blanket having a flexible front closure system which allows for unlimited adjustment while at the same time providing a strong fixed locking feature.

SUMMARY OF THE INVENTION

A principal object of the invention is to provide a front closure system for a horse blanket which will allow for unlimited adjustment and at the same time provide a secure closure.

Another object is to provide a front closure for a horse blanket utilizing a dual closure and securing system including mutually adherent fastener means such as hook and loop closure material and adjustable straps.

Another object is to provide a front closure for a horse blanket utilizing a dual closure and securing system which allows the blanket to be used either as a closed front blanket or an open front blanket once it has been adjusted to the animal.

Additional objects and features of the invention will become more apparent from the following description and accompanying drawings.

DESCRIPTION OF THE PREFERRED EMBODIMENT

Figure 1:
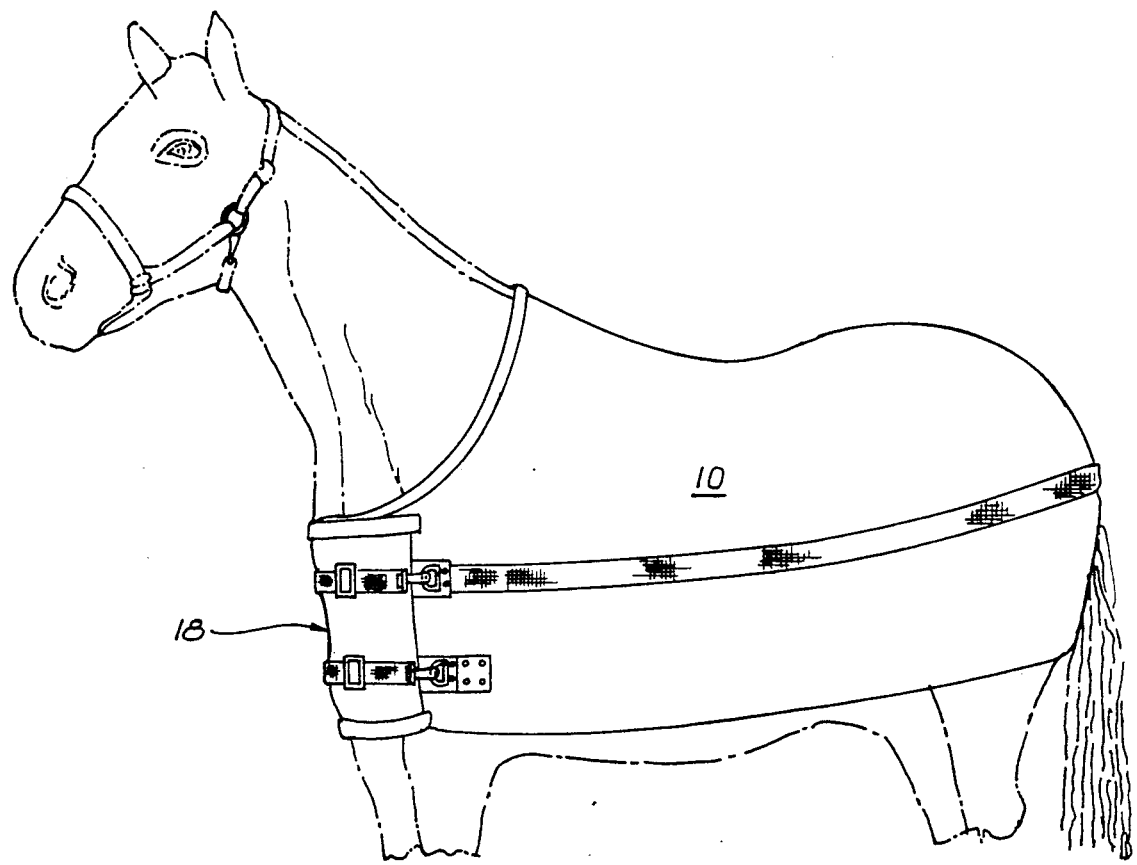
FIG. 1 is a perspective view showing the outline of a horse in phantom covered by a horse blanket embodying the invention disclosed herein.
Figure 11:
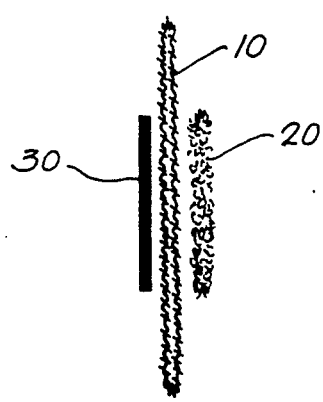
FIG. 11 is an enlarged exploded cross-sectional view taken along line 11—of FIG. 2 illustrating on one front flap portions of webbing, blanket material, and a first portion of mutually-adherent fastener means.
Figure 12:
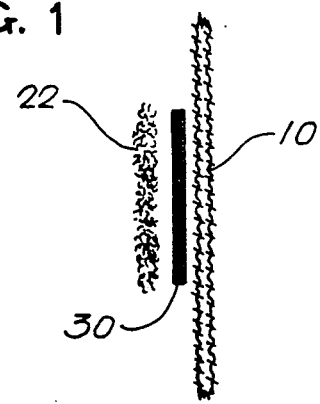
FIG. 12 is an enlarged exploded cross-sectional view taken along line 12—12 of FIG. 2 illustrating on the other front flap portions of blanket material, webbing and a second portion of mutually-adherent fastener means.
Figure 2:
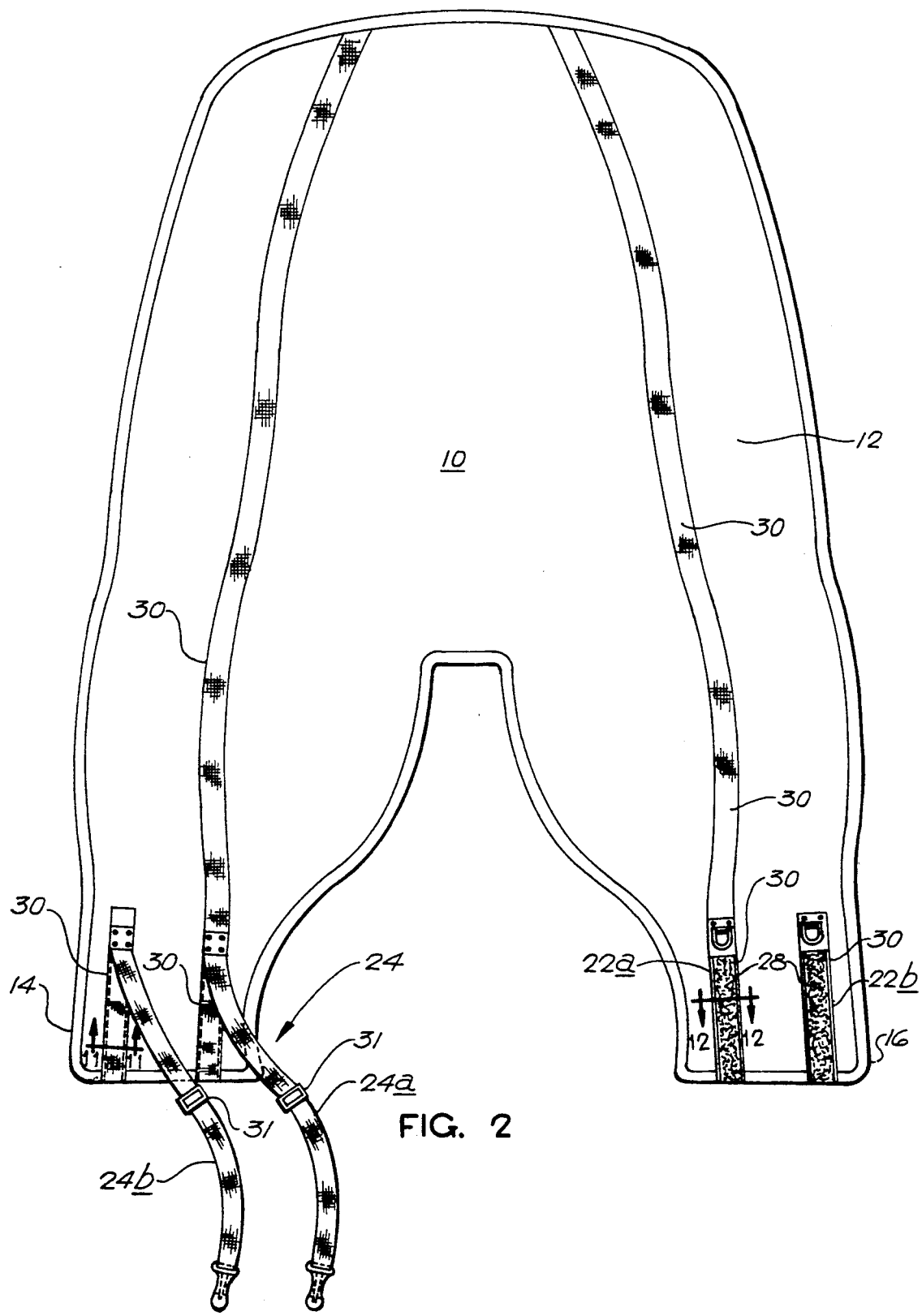
FIG. 2 is a top plan view of the horse blanket embodying the invention disclosed herein spread flat and illustrating at the lower portion thereof the blanket front closure devices attached to the blanket.
Figure 4:
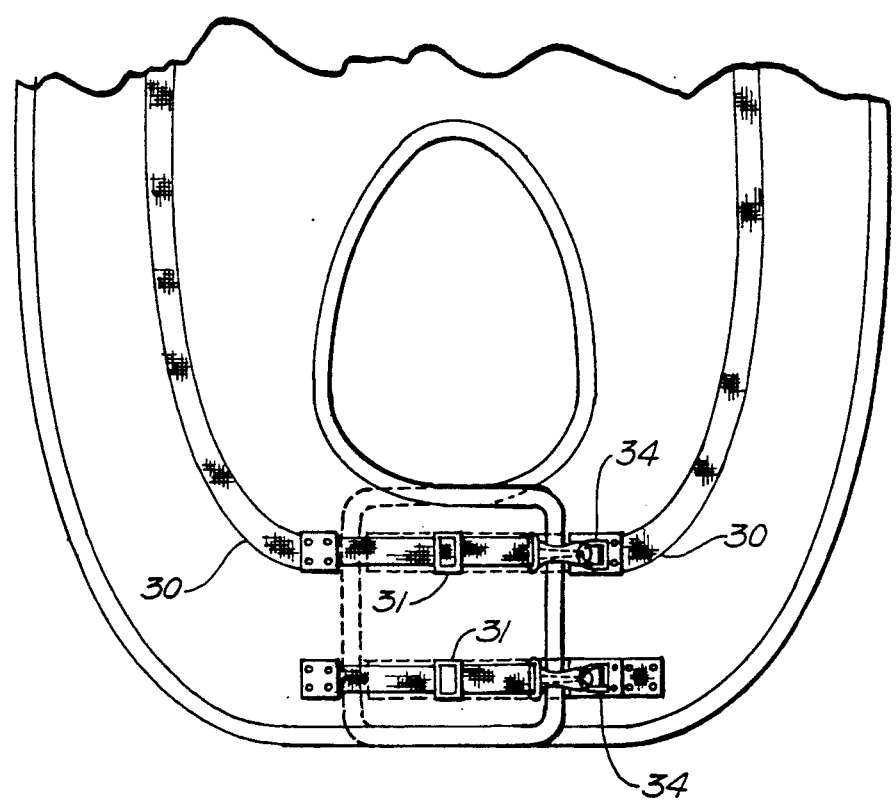
FIG. 4 is a front view of a portion of the horse blanket showing the front flaps of the blanket in a closed position.
Figure 3:
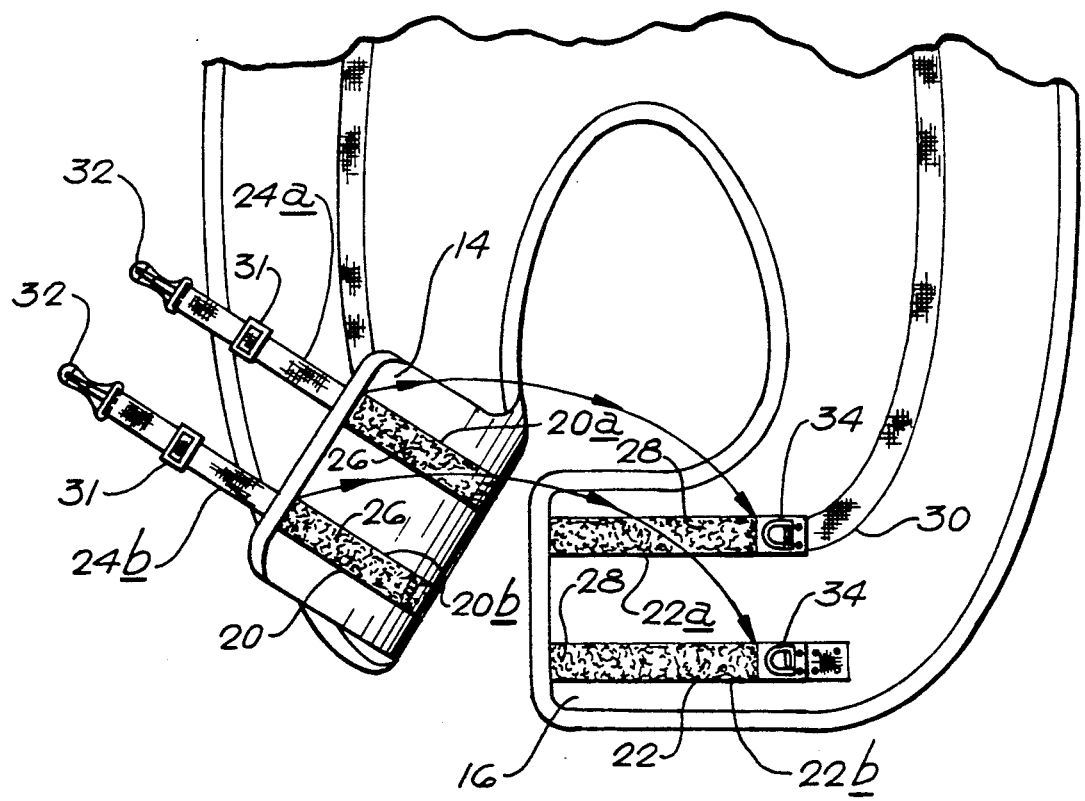
FIG. 3 is a top plan view of the front closure devices of the blanket of FIG. 2 illustrating the front flaps of the blanket in an open position.

Referring now to the drawings wherein like reference characters refer to like parts, the horse blanket 10 of FIGS. 1 and 2 includes a main body portion 12 and a pair of front flap portions 14 and 16 forming an integral extension of the main body portion. When the blanket 10 is draped over a horse as shown in FIG. 1, the front flaps 14 and 16 are secured in an overlapping position as shown in FIGS. 1 and 4. The front flaps 14 and 16 are secured in a closed position by a dual front closure system 18 which includes (a) interlocking fabric fastener means defined by mutually adherent fastener members 20a, 20b and 22a, 22b of the so-called loop and hook type and (b) adjustable strap means 24 here shown as including a pair of strap members 24a and 24b. The fastener members consist of loop-like fiber elements 26 in members 20a and 20b and hook-like fiber elements 28 in members 22a and 22b. These hook-like and loop-like elements may be reversed. These elements of the interlocking fabric fastener means are pressure-sensitive in that they cling and adhere tightly to each other when pressed together, but are repeatedly manually separated by pulling on the free end of the material to which they are attached. This type of fastener is sometimes referred to in the trade as VELCRO and is described in detail in U.S. Pat. Nos. 2,714,437, 3,009,235 and 3,562,044. As best shown in FIGS. 2 and 3, the mutually-adherent fastener members 20 and 22, or VELCRO members may be made in suitable strip form. They are attached to the flaps 14 and 16 by any suitable means such as by stitching or by an adhesive. The VELCRO strip members 20 and 22 are also positioned to overlie a portion of the strip of webbing 30 which may run the length of the blanket and serve generally as blanket reinforcement elements. As a consequence, when the VELCRO strip, a portion of the blanket material 10 and a portion of the webbing 30 are sewn or otherwise secured together in an assembly, a very strong assembly is provided and this in turn provides a strong fastener construction. Cross-sections of such assemblies are shown in FIGS. 11 and 12. By way of example, in one such blanket construction the VELCRO strips themselves are approximately nine inches in length and two inches in width.

As shown in FIGS. 2 and 3, the strip members 20a and 20b are disposed on the underside of flap 14 and members 22a and 22b are disposed on the upper side of flap 16 so that when flap 14 folds over on flap 16, the members 20 and 22 will adhere to each other to maintain a fixed closure in whatever adjusted relative position the flaps 14 and 16 are positioned.

Figure 5A:
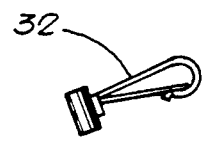
FIG. 5A illustrates one type of snap hook that is used to secure the front closure straps in place.
Figure 5:
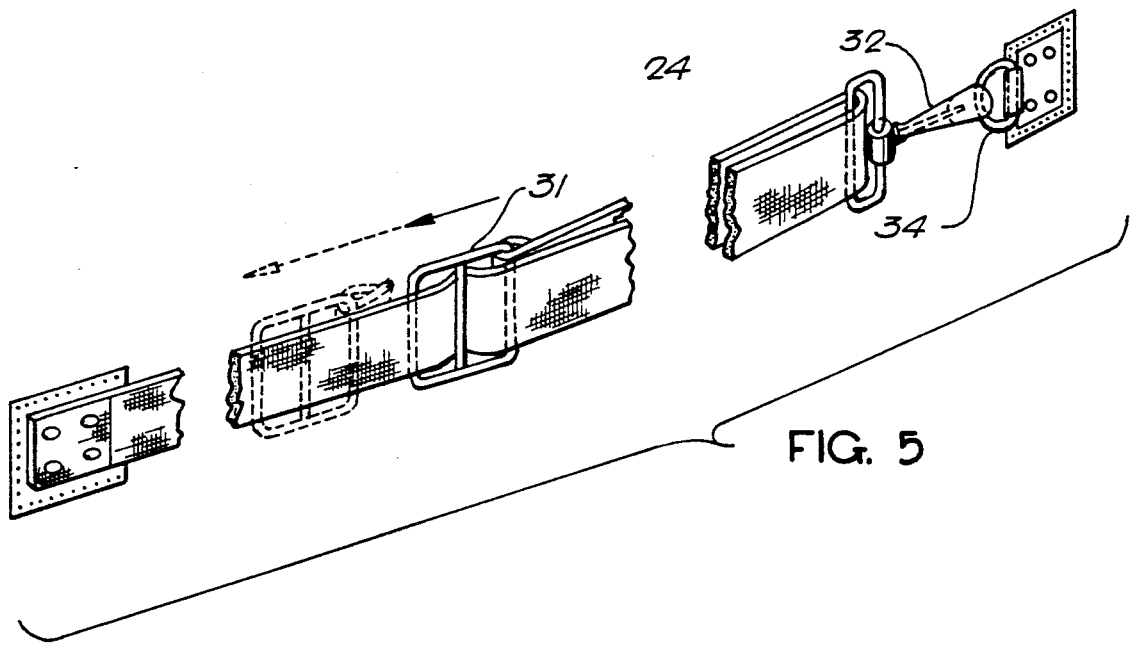
FIG. 5 is an exploded view in perspective of one of the front closure adjustable straps extended between a fixed position on one front flap and a hooked position on the other front flap.
Figure 6:
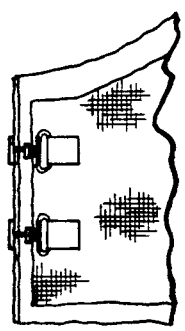
FIGS. 6–10 are partial views in elevation of several different types of prior art horse blanket front closure constructions.
Figure 7:
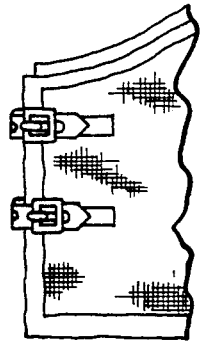
Figure 8:
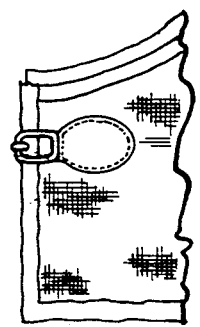
Figure 9:
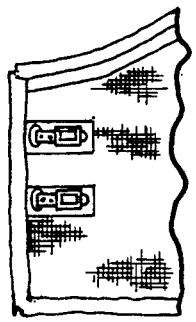
Figure 10:
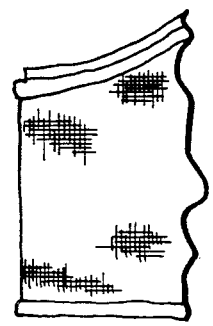

The dual front closure system 18 also includes the adjustable strap means 24, which as here shown in FIGS. 2 and 3 includes a pair of web-type adjustable straps 24a and 24b. Such a strap is shown in FIG. 5. These straps are fixed at one end to one of the flap portions and in the assembly overlie the VELCRO strip fasteners and the webbing 30. Each of the straps 24 are adjustable in length by means of an adjustment bracket or slidable loop 31. The free end of the strap may be releasably secured to the other front flap by a snap hook 32 which is snapped into engagement with D-ring 34 which is secured to front flap 16.

This dual front closure system is particularly effective and constitutes a substantial improvement over prior art devices. The interlocking fabric fasteners (VELCRO strips) allow for unlimited adjustment and a fixed locking feature once properly adjusted. Once this adjustment is made, then the slide loop on the strap may be moved to adjust the length of the strap and the snap hook then attached to the D-ring set in the heavy web. This provides a solid strong closure. Once adjusted to a particular horse, the blanket can be put on and taken off as a closed blanket over the horse's head overcoming all fitting objections. It can also be used as an open front with perfect adjustments and fit each time the blanket is put on and taken off. The adjustable straps, once adjusted, will always only allow the blanket to be fitted to the previously fitted position.

It will be appreciated that additional fastening means (not shown) normally also would be provided to secure the skirt portion and the rear portion of the blanket to the horse.

It will also be appreciated that while the principles of construction alluded to herein have been described particularly with reference to a horse blanket or similar horse cover, those same principles are equally applicable to blankets or covers for other quadruped animals and the invention as described and claimed herein is so intended.

It will be apparent from the above that I have advantageously provided an improved horse blanket embodying an improved dual front closure system which eliminates numerous problems previously encountered with both closed and open front types of horse blankets.

While a preferred embodiment of the invention has been disclosed, it will be appreciated that this is shown by way of example only, and the invention is not to be limited thereto as other variations will be apparent to those skilled in the art, and the invention is to be given its fullest interpretation within the terms of the following claims.

What is claimed is:

1. A horse blanket including a main body portion adapted to be draped over a horse and first and second front flap portions formed integrally with said main body portion, and further comprising:
 a dual front closure system associated with the front flap portions for effecting unlimited adjustment and a secure closure including
 first interlocking fabric fastener means attached to the inside surface of one of said front flap portions,
 second interlocking fabric fastener means attached to the outside surface of the other of said front flap portions,
 said first and second interlocking fabric fastener means being engageable with each other as one part of the dual front closure system, and adjustable strap fastener means connected to the front flap portions as a second part of the dual front closure system and which includes at least one strap adjustable in length which is permanently secured at one end to one of said flap portions and further includes means at the other end of said strap for releasably securing said other end to the other of said flap portions.

2. A horse blanket as defined in claim 1 wherein said first and second interlocking fabric fastener means are of a hook and loop construction.

3. A horse blanket as defined in claim 1 wherein said first and second interlocking fabric fastener means comprise at least one pair of elongated mating strips of hook and loop material positioned on said front flap portions in a substantially horizontal position when the blanket is in a covering position on a horse and the closure system is in a closed position.

4. A horse blanket as defined in claim 1 wherein said first and second interlocking fabric fastener means each comprise a pair of spaced strips of hook and loop material.

5. A horse blanket as defined in claim 1 wherein the dual front closure system includes web reinforcing means connected to the exposed face of the blanket front flap portions to thereby form at that point of connection a layered structure consisting of interlocking fabric fastener means, blanket material and web reinforcement strip means whereby a strong closure structure is achieved.

6. A horse blanket as defined in claim 1 wherein said adjustable strap fastener means comprises at least one web type strap means adjustable in length which is permanently secured at one end to one of said flap portions and includes means at its other end for releasably securing said other end to the other of said flap portions.

7. A horse blanket as defined in claim 1 wherein said adjustable strap fastener means comprises at least one web type strap means adjustable in length and permanently secured at one end to one of said flap portions and including snap hook means at its other end, and further includes D-ring means secured to the other of said flap portions and engageable by said snap hook means.

8. A horse blanket as defined in claim 1 wherein said adjustable strap fastener means is disposed on said front flap in a position overlying said interlocking fabric fastener means.

9. A horse blanket as defined in claim 1 wherein at least one VELCRO-type fastener means and at least one adjustable strap fastener means are used as part of the dual closure system.

10. A horse blanket as defined in claim 1 wherein two VELCRO-type fasteners are used and at least one adjustable strap fastener is used as part of the dual closure system.

11. A horse blanket as defined in claim 1 wherein two adjustable web-type strap fasteners are used and at least one VELCRO-type fastener is used as part of the dual closure system.

12. A dual front closure structure for a blanket for a horse or other quadruped animal comprising:
first and second front flaps formed integrally with the blanket,
first interlocking fabric fastener means attached to the inside of one of said flaps,
second interlocking fabric fastener means attached to the outside of the other of said flaps,
said first and second interlocking fabric fastener means being engageable with each other as part of the front closure for securing said blanket on a horse, and
adjustable strap fastener means connected to said front flaps to provide an additional part of the front closure structure and which includes at least one strap adjustable in length which is permanently secured at one end to one of said flaps and further includes means at the other end of said strap for releasably securing said other end to the other of said flaps.

13. The dual front closure structure of claim 12 wherein
said interlocking first and second fabric fastener means are of a hook and loop construction.

14. The dual front closure structure of claim 12 wherein
said first and second interlocking fabric fastener means each comprise a pair of spaced strips of hook and loop material.

15. The dual front closure structure of claim 12 including:
web reinforcing means connected to the exposed face of the blanket front flaps to thereby form at that point of connection a layered structure consisting of interlocking fabric fastener means, blanket material and web reinforcing strip means whereby a strong closure structure is achieved.

16. The dual front closure structure of claim 12 wherein
said adjustable strap fastener means comprises at least one web type strap means adjustable in length and permanently secured at one end to one of said flaps and including snap hook means at its other end, and further includes D-ring means secured to the other of said flaps engageable by said snap hook means.

17. The front closure structure of claim 12 wherein said adjustable strap fastener means are disposed on said front flap in a position overlying said interlocking fabric fastener means.

* * * * *